US010846652B2

(12) United States Patent
Wahlmeier et al.

(10) Patent No.: US 10,846,652 B2
(45) Date of Patent: Nov. 24, 2020

(54) SYSTEMS AND METHODS FOR PRODUCT SORTATION

(71) Applicant: Walmart Apollo, LLC, Bentonville, AR (US)

(72) Inventors: Shayne Wahlmeier, Bentonville, AR (US); Bryan Rogers, Centerton, AR (US); Jessica Lynn Solana, Bentonville, AR (US); Mustafa Ali Harcar, Centerton, AR (US); Andrew Joseph Rizkallah, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 108 days.

(21) Appl. No.: 15/452,721

(22) Filed: Mar. 7, 2017

(65) Prior Publication Data
US 2017/0262796 A1  Sep. 14, 2017

Related U.S. Application Data (60) Provisional application No. 62/305,816, filed on Mar. 9, 2016.

(51) Int. Cl.
*G06Q 10/08* (2012.01)
*G06Q 30/04* (2012.01)

(52) U.S. Cl.
CPC .................... *G06Q 10/087* (2013.01)

(58) Field of Classification Search
CPC .............. B07C 7/04; G06Q 30/04; G06F 7/00
See application file for complete search history.

(56) References Cited

U.S. PATENT DOCUMENTS

| 5,547,063 A | * | 8/1996 | Bonnet | B07C 1/02 |
| | | | | 198/370.02 |
| 6,095,315 A | * | 8/2000 | Andersch | B07C 1/025 |
| | | | | 198/370.03 |

(Continued)

OTHER PUBLICATIONS

Wohlsen, Marcus, A Rare Peek Inside Amazon's Massive Wish-Fulfilling Machine, WIRED, http://www.wired.com/2014/06/inside-amazon-warehouse/, last viewed Jan. 14, 2016.

(Continued)

*Primary Examiner* — Talia F Crawley
(74) *Attorney, Agent, or Firm* — McCarter & English, LLP (57) ABSTRACT

Methods and systems are provided herein for operation of a sortation system. The methods and systems include a first conveyor configured to transport a receptacle to a sortation station. The methods and systems also include a sorter including a plurality of vessels. Each vessel can be configured to receive at least one product of a plurality of products from the receptacle at the sortation station. Each vessel includes an ejection mechanism for ejecting the at least one product at a sortation delivery station. The sortation delivery station corresponds to the at least one product based on at least one identifier assigned to the product. The methods and systems also include an order consolidation station including a plurality of order-specific portions, each order-specific portion configured to receive the product from the sortation delivery station based on the at least one identifier.

21 Claims, 5 Drawing Sheets

(56) References Cited

U.S. PATENT DOCUMENTS

| | | | |
|---|---|---|---|
| 7,426,484 B2 | 9/2008 | Joyce et al. | |
| 8,103,377 B1 | 1/2012 | Wong et al. | |
| 8,682,473 B1 | 3/2014 | Ramey et al. | |
| 8,892,240 B1 | 11/2014 | Vliet et al. | |
| 2002/0130065 A1 | 9/2002 | Bloom | |
| 2002/0162725 A1* | 11/2002 | Nakajima | G07F 1/047 194/302 |
| 2003/0038065 A1* | 2/2003 | Pippin | B65H 29/60 209/584 |
| 2006/0206235 A1 | 9/2006 | Shakes et al. | |
| 2012/0215344 A1* | 8/2012 | Battles | B65G 1/1371 700/215 |
| 2014/0350717 A1* | 11/2014 | Dagle | B65G 1/1373 700/216 |
| 2016/0239789 A1* | 8/2016 | Hanks | G06Q 10/083 |
| 2016/0256898 A1* | 9/2016 | Alsop, Sr. | B07B 13/00 |
| 2018/0319603 A1* | 11/2018 | Zak | B65G 17/345 |

OTHER PUBLICATIONS

Invata intralogistics, Batch Picking Slashes Order Hiding Labor, http://www.invata.com/the-invata-difference/case-studies/batch-picking/ , last view Jan. 14, 2016.

Picking, putting and a consolidation flow rack using Remstar Horizaontal Carousels, https://www.youtube.com/watch?v=Ir9IZO3LE9M, uploaded to YouTube Dec. 10, 2009.

Crisplant LS-4000 Sorting Solution at Nike Logistics Center in China <https://www.youtube.com/watch?v=CwljR3WqdfM>.

\* cited by examiner

```
┌─────────────────────────────────────────────────────────────────────────┐
│ Receive, at a first conveyor, at least one receptacle including a plurality of products. │
│                                     301                                  │
└─────────────────────────────────────────────────────────────────────────┘
                                      ↓
┌─────────────────────────────────────────────────────────────────────────┐
│ Transport, by the first conveyor, the at least one receptacle to a sortation station. │
│                                     303                                  │
└─────────────────────────────────────────────────────────────────────────┘
                                      ↓
┌─────────────────────────────────────────────────────────────────────────┐
│ Transfer, at the sortation station, at least one product of the plurality of products from the at │
│ least one receptacle to one of a plurality of vessels of a sorter based on at least one identifier │
│         assigned to the at least one of the plurality of products.      │
│                                     305                                  │
└─────────────────────────────────────────────────────────────────────────┘
                                      ↓
┌─────────────────────────────────────────────────────────────────────────┐
│ Eject, using an ejection mechanism of the vessel, the at least one product of the plurality of │
│ products from the vessel in response to transportation of the vessel by the sorter to one of a │
│      plurality of sortation delivery stations corresponding to the ejected product.      │
│                                     307                                  │
└─────────────────────────────────────────────────────────────────────────┘
                                      ↓
┌─────────────────────────────────────────────────────────────────────────┐
│ Transfer the at least one product of the plurality of products from the corresponding │
│ sortation delivery station to one of a plurality of order-specific portions of an order │
│ consolidation station based on the at least one identifier assigned to the at least one of the │
│                          plurality of products.                          │
│                                     309                                  │
└─────────────────────────────────────────────────────────────────────────┘
```

SYSTEMS AND METHODS FOR PRODUCT SORTATION

CROSS-REFERENCE TO RELATED PATENT APPLICATIONS

This application claims priority to U.S. Provisional Application No. 62/305,816 filed on Mar. 9, 2016, the content of which is hereby incorporated by reference in its entirety.

FIELD OF TECHNOLOGY

The present disclosure relates generally to product sortation and more particularly to product singulation and consolidation.

BACKGROUND

Conventionally, products are retrieved from a storage facility on an order by order basis. However, such conventional systems can be inefficient, and are prone to bottlenecks.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

As discussed above, conventional product sortation systems require products to be retrieved from a storage facility on an order by order basis, precluding more efficient, location-based batch product retrieval. Accordingly, the example systems and methods herein provide singulation and consolidation systems for processing batch-picked products.

Methods and systems are provided herein for operation of a sortation system. The methods and systems, in accordance with various embodiments, a first conveyor configured to transport at least one receptacle to a sortation station, the at least one receptacle configured to receive a plurality of products. The methods and systems can also include, for example, a sorter comprising a plurality of vessels. Each vessel of the plurality of vessels can be, for example, configured to receive at least one product of the plurality of products from the sortation station for transportation by the sorter. Each vessel of the plurality of vessels can include, for example, an ejection mechanism for ejecting the at least one product of the plurality of products at a specified sortation delivery station. The specified sortation delivery station corresponds to the at least one product of the plurality of products based on at least one identifier assigned to the at least one product. The methods and systems can also include, for example, an order consolidation station comprising a plurality of order-specific portions, each order-specific portion of the plurality of order-specific portions configured to receive the at least one product of the plurality of products from the sortation delivery station based on the at least one identifier assigned to the at least one product.

Figure 1:
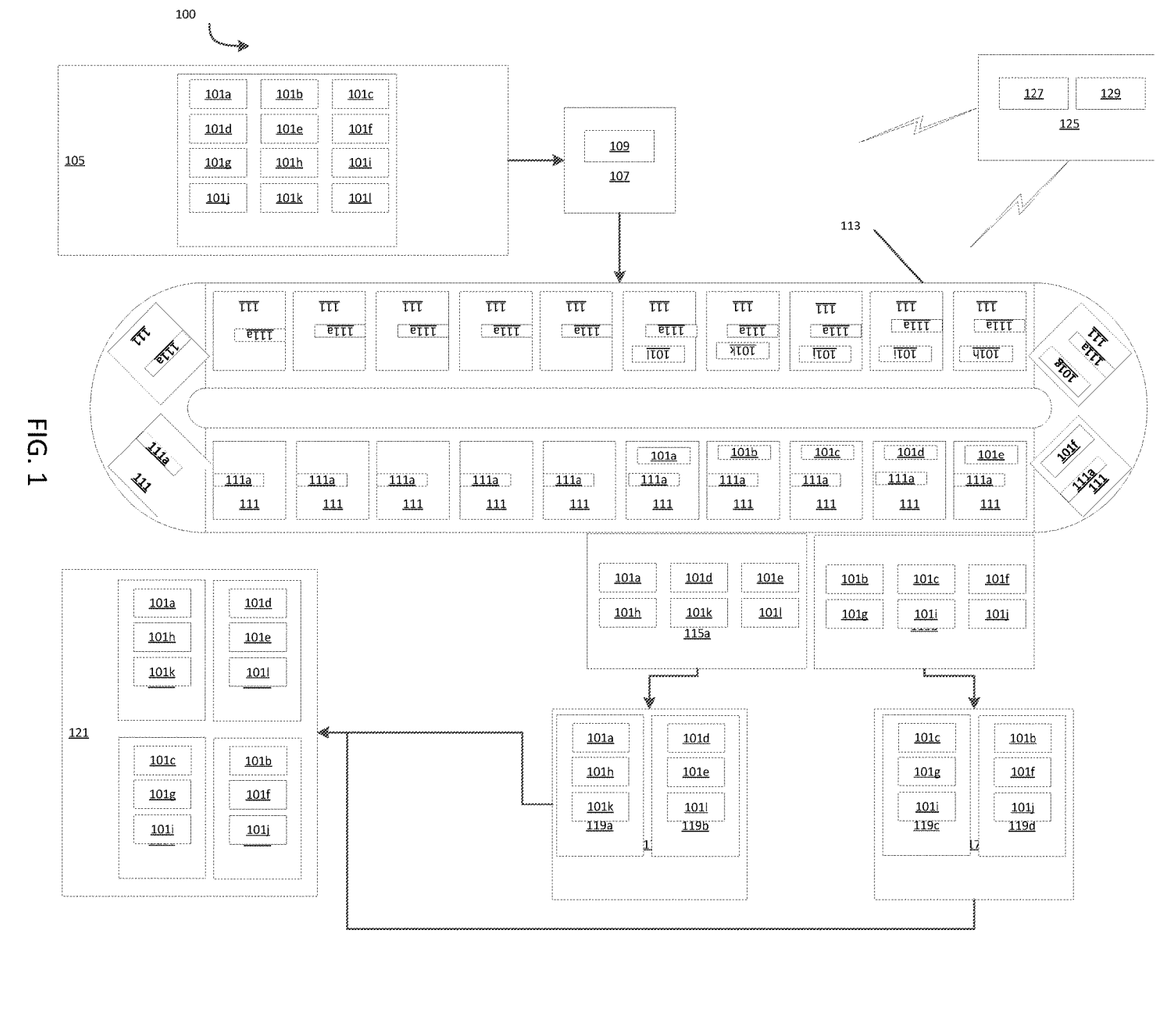
FIG. 1 is a block diagram showing an example sortation system in accordance with various embodiments.
Figure 2:
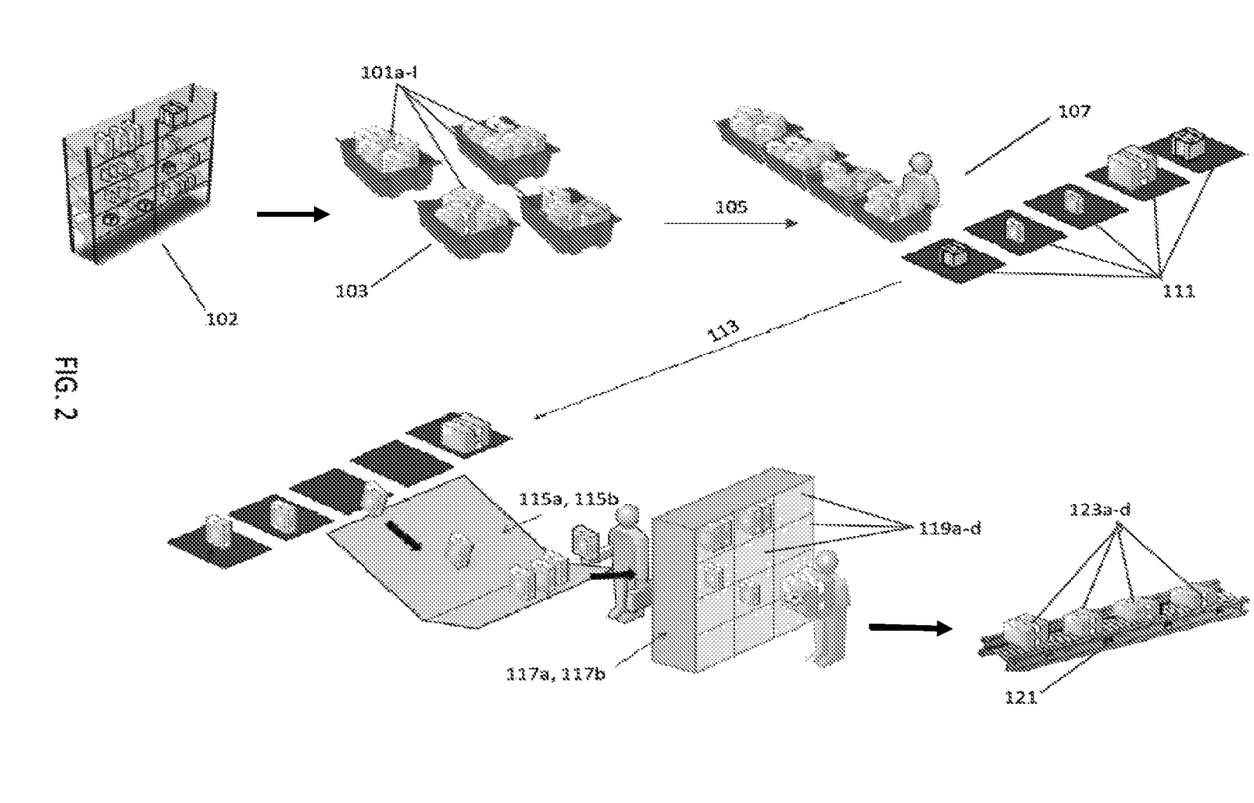
FIG. 2 is a perspective view of an example functional flow of the sortation system of FIG. 1 in accordance with various embodiments.

Referring now to FIGS. 1 and 2, an exemplary sortation system 100 includes a first conveyor 105 configured to transport at least one receptacle 103 to a sortation station 107. The at least one receptacle 103 is configured to receive a plurality of products 101a-1 picked from an inventory 102. The system 100 also includes a sorter 113 including a plurality of vessels 111, each vessel of the plurality of vessels configured to receive at least one product 101a-1 of the plurality of products 101a-1 from the sortation station 107 for transportation by the sorter 113. Each vessel of the plurality of vessels 111 includes an ejection mechanism 111a for ejecting the at least one product 101a-1 of the plurality of products 111a-1 at a specified sortation delivery station 115a, 115b. The specified sortation delivery station 115a, 115b corresponds to the at least one product of the plurality of products 101a-1 based on at least one identifier assigned to the at least one product 101a-1. The system 100 also includes an order consolidation station 117a, 117b having a plurality of order-specific portions 119a-d. Each order-specific portion 119a-d of the plurality of order-specific portions 119a-d configured to receive the at least one product 101a-1 of the plurality of products 101a-1 from the sortation delivery station 115a, 115b based on the at least one identifier assigned to the at least one product 101a-1. The system 100 can, in accordance with various embodiments, also include a packaging station 121 for receiving one or more of the products 101a-1 from one of the order-specific portions 119a-d and packaging the received one or more of the products 101a-1.

The products 101a-1, in accordance with various embodiments, can include any product capable of being sold, warehoused, or purchased such as, for example, any grocery or other food product, any electronics product, any retail product, clothing, toys, pet supplies, hardware supplies, home goods, any other product, or combinations thereof. The receptacles 103 in accordance with various embodiments, can include boxes, totes, bins, carts, sacks, other suitable receptacles for transporting products, or combinations thereof. The receptacles 103, in accordance with various embodiments, can be filled with products 101a-1 picked from an inventory 102. Picking can be performed, for example, by a human picker, a robot arm, a chute, a tilting mechanism, a manipulator, an automaton, a gripper, any other suitable pick mechanism, or combinations thereof in response, for example, to receipt, at the central computing system 125, of order information associated with one or more orders.

The first conveyor 105, in accordance with various embodiments, can include, for example, one or more belt conveyors, slider bed conveyors, wire mesh belt conveyors, roller conveyors, skatewheel conveyors, ball transfer tables, gravity conveyors, belt over roller conveyors, motor driven roller conveyors, zero pressure conveyors, carousel conveyors, bucket conveyors, any other suitable conveyor for transporting the products 101a-1 via one or more of the receptacles 103 to the sortation station 107. The sortation station 107, in accordance with various embodiments can be, for example, a table, a tiltable table or platform, an electronic terminal, a robot arm, an automaton, a gripper, a conveyor connecting the first conveyor and the sorter, any other suitable station for sorting products received in the receptacle(s) 103, or combinations thereof. The sortation station 107, in accordance with various embodiments, can include a scanning device 109. The scanning device 109, can be any device suitable for reading and/or transmitting product identification data, including for example, an RFID reader, a NFC reader, a barcode reader, a digital camera, a mobile device, a magnetic strip reader, a point of sale terminal, a 5-sided scanner, a 6-sided scanner, an automated scanner, any other suitable device, or combinations thereof.

The scanning device 109, in accordance with various embodiments can be configured to scan or read a product identifier. The product identifier, in accordance with various embodiments can include, for example a barcode, a one-dimensional barcode, a two-dimensional barcode, an RFID tag, or an NFC tag associated with the item. In accordance with various embodiments, the product identifier can be product type identifier such as a SKU number or can be a unit label unique to each particular one of the plurality of products 101a-1. The scanning device 109 can also be configured, in accordance with various embodiments, to scan or read a vessel identifier. The vessel identifier, in accordance with various embodiments can include, for example a barcode, a one-dimensional barcode, a two-dimensional barcode, an RFID tag, or an NFC tag associated with the scanned vessel. In accordance with various embodiments, the scanning device 109 or an additional scanning device can also be used for automated or manual scanning of the receptacle 103 to associate the receptacle with the sortation station 107.

Upon scanning the product identifier corresponding to one of the products 101a-1, the scanned one of the products 101a-1 can be placed in or on one of the vessels 111 of the sorter 113. The scanning device 109 can be used to scan the vessel identifier corresponding to the one of the vessels 111. In accordance with various embodiments, the scanning device 109 can be configured to transmit the product identification and vessel identification to a central computing system 125. The central computing system 125, by a processor 127 of the central computing system 125, can create an association between the product identifier (and thus the product 101a-1) and the vessel identifier (and thus the vessel 111). The association between the product 101a-1 and the vessel 111 can then be stored in a memory 129 of the central computing system 125.

Central computing system 125 can include, for example, a desktop computer, a laptop computer, a tablet, a smartphone, a server, a computing cloud, a mobile computer, a wearable device, combinations thereof, or any other suitable device or devices capable of electronic communication with the computing system 125 having the processor 127 and the memory 129. Processor 127, in accordance with various embodiments can include, for example, but is not limited to, a microchip, a processor, a microprocessor, a special purpose processor, an application specific integrated circuit, a microcontroller, a field programmable gate array, any other suitable processor, or combinations thereof. Memory 129, in accordance with various embodiments can include, for example, but not limited to, hardware memory, non-transitory tangible media, magnetic storage disks, optical disks, flash drives, computational device memory, random access memory, such as but not limited to DRAM, SRAM, EDO RAM, any other type of memory, or combinations thereof.

In accordance with various embodiments, the computing system 125 can also be in communication with a mobile computing device or wearable device associated with the human picker or automated pick mechanism (the picker) for directing the picker, for example, which products 101a-1 to retrieve from inventory 102, where to retrieve the products 101a-1 from inventory 102, a most efficient path for retrieving the products 101a-1 from inventory, and which of one or more of the receptacles 103 the picker should place each of the products 101a-1 in.

The sorters 113, in accordance with various embodiments, can include, for example, one or more belt conveyors, slider bed conveyors, wire mesh belt conveyors, roller conveyors, skatewheel conveyors, ball transfer tables, gravity conveyors, belt over roller conveyors, motor driven roller conveyors, zero pressure conveyors, carousel conveyors, bucket conveyors, cross belt sorters, shoe sorters, popup sorters, tray sorters, bomb-bay sorters, any other suitable conveyor or sorter for transporting the products 101a-1 in the vessels 111, or combinations thereof. The vessels 111 can include, for example, platforms, boxes, buckets, pallets, trays, other suitable vessels or receptacles, or combinations thereof. The vessels 111 in accordance with various embodiments, can include an ejection mechanism 111a for ejecting one of the products 101a-1 therefrom. In accordance with various embodiments, the ejection mechanism can include, for example, a robot arm, a chute, a tilting mechanism, a manipulator, an automaton, or a gripper, any other suitable ejection mechanism, or combinations thereof. The ejection mechanism, in accordance with various embodiments, can be activated, for example, in response to instructions received from the central computing system 125. The central computing system 125, in accordance with various embodiments, can be configured to transmit activation instructions to the ejection mechanism of the vessel 111 in response to detecting, e.g., by a vessel tracking system (not shown), that the vessel has been transported to a sortation delivery station 115a, 115b corresponding to an order corresponding to the product 101a-1 associated with the vessel 111 in the memory 129 of the central computing system 125.

The sortation delivery station 115a, 115b can include, for example, a ramp, a chute, a conveyor, a platform, a bin, a case, a carton other suitable stations for receiving one or more of the products 101a-1, or combinations thereof. The products 101a-1, upon arrival at the sortation delivery station 115a, 115b, can then be transferred from the sortation delivery station 115a, 115b to a corresponding order consolidation station 117a, 117b. It will be apparent in view of this disclosure that the products 101a-1 associated with any one order can advantageously be received at the sortation delivery station 115a, 115b and transferred to the corresponding order consolidation station 117a, 117b in any order or combination (e.g., in a non-chronological order, intermixed with products associated with orders, arriving at the sortation delivery station before space is available at the order consolidation station, or any other order or combination).

The order consolidation stations 117a, 117b each include a plurality of order specific portions 119a-d. Each of the products 101a-1 can, in accordance with various embodiments, be consolidated, based on an order corresponding to the product 101a-1 and one of the order specific portions 119a-d. In accordance with various embodiments, the corresponding order-specific portions 119a-d of the corresponding order consolidation station 117a, 117b can be identified for each of the products 101a-1 by manually or automatically scanning each of the products 101a-1 being transferred from the sortation delivery station 115a, 115b.

The order consolidation station 117a, 117b can include, for example, a shelving unit, a platform, a table, a bin, a carton, any other suitable consolidation station, or combinations thereof. The order specific portions 119a-d can include any suitable division of the order consolidation station 117a, 117b such as, for example, individual sections of a shelving unit, bins on a platform or table, any other suitable order specific portion, or combinations thereof. It will be apparent in view of this disclosure that the number and configuration of order-specific portions 119a-d of each order consolidation station 117a, 117b can, in accordance with various embodiments, be dynamically adjusted, changed, or reconfigured as needed. For example, interior dividers of a shelving unity can be manually or automatically removed to accommodate larger items or orders having a large number of items, thereby reconfiguring and reducing the number of order-specific portions 119a-d of the order consolidation station 117a, 117b. In accordance with various embodiments, the capacity of the sortation delivery station 115a, 115b can be larger than the capacity of the corresponding consolidation station 117a, 117b so that more products 101a-1 can be accumulated at the sortation delivery station 115a, 115b when the order consolidation station 117a, 117b is at capacity. This configuration can advantageously prevent bottlenecks or other product flow impediments associated with waiting for downstream or upstream delays to be resolved.

Upon completion of an order (i.e., each product 101a-1 corresponding to a one of the order specific portions 119a-d has been transferred from the sortation delivery station 115a, 115b to the corresponding order specific portion 119a-d of the corresponding order consolidation station 117a, 117b), the products 101a-1 from the corresponding order specific portion 119a-d of the order consolidation station 117a, 117b can be transferred to a packaging station 121 for inclusion in a packaged order 123a-d. For example, products 101a, 101h, and 101k of order specific portion 119a can be packaged into a packaged order 123a). In accordance with various embodiments, one packaged order 123a-d can include products from a plurality of order specific portions 119a-d of one or more order consolidation stations 117a, 117b.

Referring now to FIGS. 1 and 2, in use, the operation of the sortation system 100 can be initiated, in accordance with various embodiments, upon receipt, at the central computing system 125, of order information associated with one or more orders. The central computing system 125 then requests a plurality of products 101a-1 associated with the order(s) to be pulled from inventory 102 by a picker (e.g., as described above). The products 101a-1, in accordance with various embodiments, can be pulled in whichever way is most efficient and placed in one or more receptacles 103 for further transport. In accordance with various embodiments, the picker can scan each product 101a-1 and corresponding receptacle(s) 103 (e.g., by a mobile device of a human picker) and transmit the scanned data to the central computing system 125 to associate those products 101a-1 with the receptacle(s) for tracking and routing of the products 101a-1 and receptacles 103 through the system 100 by the central computing system 125. It will be apparent in view of this disclosure that the products 101a-1 placed in each receptacle 103 do not need to be grouped within the receptacle 103 with other products associated with the same order, pulled in any particular sequence, or arranged in any particular order or combination. It will be further apparent in view of this disclosure that the products 101a-1 can be placed in a single receptacle 103, distributed among multiple receptacles 103, picked by the picker in a single "picking trip," or picked over multiple "picking trips."

In the receptacle(s) 103, the products 101a-1 can then be transported via the first conveyor 105 to the order consolidation station 107 where, in accordance with some embodiments, the receptacle(s) can be scanned. At the order consolidation station 107, the products 101a-1 can be removed from the receptacles 103 and placed, individually, on a corresponding one of the vessels 111. In accordance with various embodiments, the products 101a-1 can each be scanned by the scanning device 109 as they are removed from the receptacle 103. In accordance with various embodiments, each of the scanned products 101a-1 can be associated with a corresponding one of the vessels 111 by a detection sensor within the vessel 111 or the sorter 113 or the vessels 111 can be scanned when the scanned product 101a-1 is placed on or in the vessel 111. Then the scanned identification of the associated product 101a-1 as detected by or scanned with the vessel 111 can be transmitted to the central computing device 125 for storage of the association in the memory 129. Although FIG. 2 shows a human operator removing the products 101a-1 from the receptacles 103 and placing the products 101a-1 on the vessels 111, it will be apparent in view of this disclosure that the transferring of products 101a-1 from the receptacles 103 to the vessels 111 as well as the scanning of the products 101a-1 and corresponding vessels 111 can be automated (e.g., by use of a robotic arm or other suitable mechanism) in accordance with various embodiments.

The vessel 111 and the product 101a-1 can then be transported by the sorter 113 toward one or more sortation delivery stations 115a, 115b. The system 100, in accordance with various embodiments, can include a product or vessel tracking system (e.g., incorporated into the sorter 113, incorporated into the vessels 111, or a stand alone system) in electronic communication with the central computing system 125 for tracking a location of the associated product 101a-1 and vessel 111. When the central computing system 125, via the product or vessel tracking system, detects that the associated product 101a-1 and vessel 111 have arrived at a sortation delivery station 115a, 115b corresponding to an order consolidation station 117a, 117b having an order specific portion 119a-d associated with an order corresponding to the product 101a-1, the central computer system 125 can transmit activation instructions to the ejection mechanism of the associated vessel 111.

Activation of the ejection mechanism of the associated vessel 111 causes the vessel 111 to eject the associated product 101a-1 from the vessel and into an sortation delivery station 115a, 115b. Each sortation delivery station 115a, 115b corresponds to at least one order consolidation station 117a, 117b having a plurality of order specific portions 119a-d. The sortation delivery station 115a, 115b is configured to receive ejected products 101a-1 associated with orders corresponding to order specific portions 119a-d of the order consolidation station(s) 117a, 117b corresponding to the sortation delivery station 115a, 115b. Advantageously, the ejected products 101a-1 can be received at the sortation delivery station 115a, 115b in any sequence or grouping, regardless of which order or which order specific portion 119a-d the ejected products 101a-1 correspond to, allowing the now empty vessel 111 to be returned to the sortation station 107 for additional use. It will be apparent in view of this disclosure that, in accordance with various embodiments, a plurality of sortation stations 107 can be positioned around the sorter 113, interspersed between a plurality of sortation delivery stations 115a, 115b. It will further be apparent in view of this disclosure that, in accordance with such embodiments, the empty vessel 111 can proceed to at least one subsequent sortation station 107 to receive at least one additional product 101a-1 for delivery to at least one additional sortation delivery station 117a, 117b prior to returning to the original sortation station 107. Furthermore, because the products 101a-1 do not need to arrive at the sortation delivery station 115a, 115b in any particular sequence or grouping (e.g., with other products in the order) the sortation station 107 avoids inefficiency and inoperative waiting time associated with waiting for each product 101a-1 associated with an order to arrive at the sortation station 107 before placement on the sorter 113.

The products 101a-1 can then be transferred from the sortation delivery station 115a, 115b to the corresponding one of the order specific portions 119a-d of the order consolidation station 117a, 117b. The products 101a-1 can be directed to the corresponding one of the order specific portions 119a-d by, for example, scanning the products 101a-1 prior to transfer and receiving responsive direction from the central computing system 125. The products 101a-1, upon completion of the order associated with each order specific portion 119a-d can then be readily retrieved from the order specific portion(s) 119a-d for transfer to a packaging station 121. At the packaging station 121, the products 101a-1 can be packaged into a packaged order 123a-d and sent for shipping to a purchaser. It will be apparent in view of this disclosure, that any order from any order specific portion 119a-d can be transferred to any packaging station 121 in accordance with various embodiments. Although FIG. 2 shows a human operator transferring the products 101a-1 from the sortation delivery station 115a, 115b to the order consolidation station 117a, 117b and another human operator transferring the products 101a-1 from the order consolidation station 117a, 117b to the packaging station 121, it will be apparent in view of this disclosure that the transferring of the products 101a-1 from the sortation delivery station 115a, 115b to the order consolidation station 117a, 117b and the transferring of the products 101a-1 from the order consolidation station 117a, 117b to the packaging station 121 can be automated (e.g., by use of a robotic arm or other suitable mechanism) in accordance with various embodiments.

Figure 3:
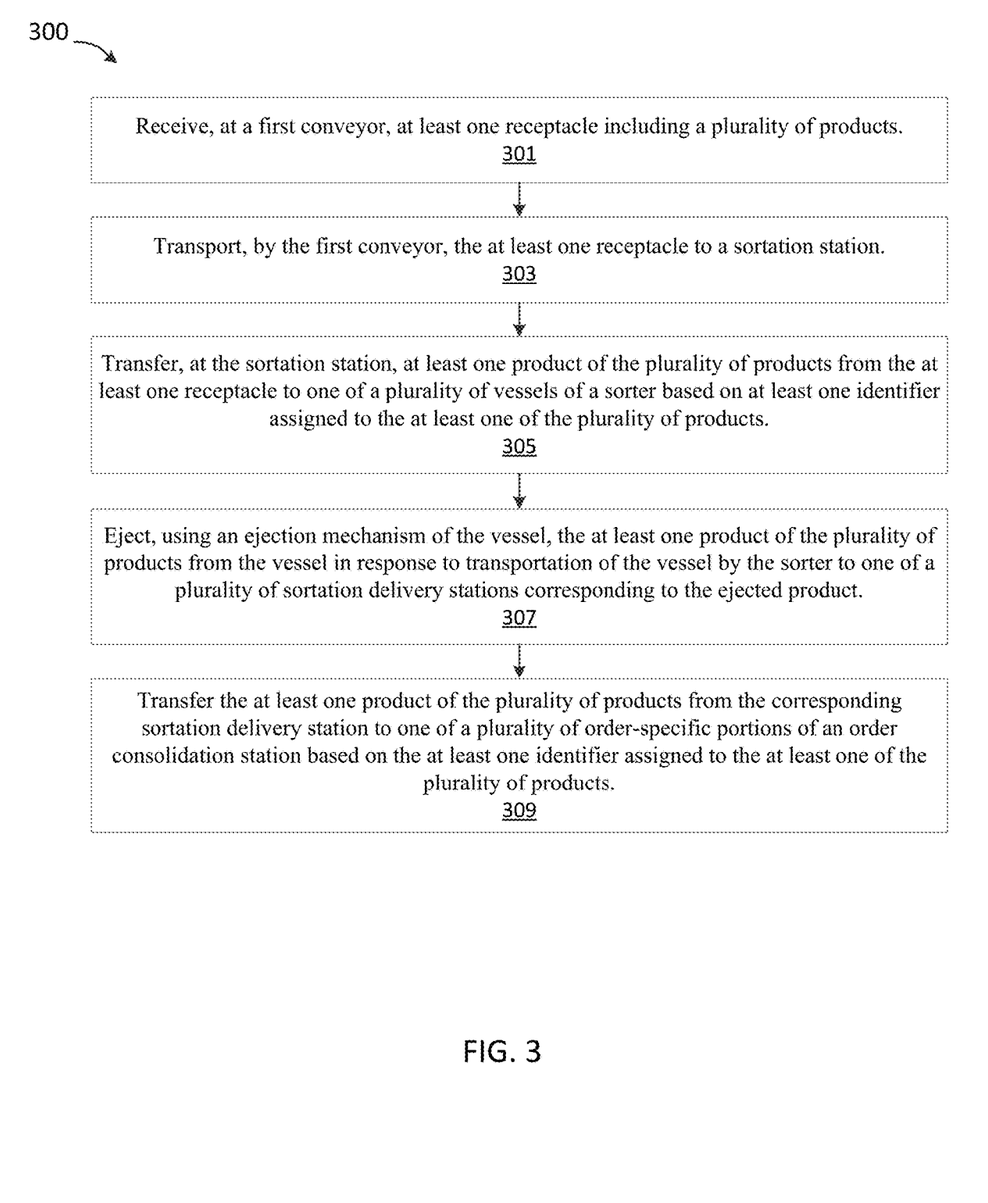
FIG. 3 is flow diagram illustrating an example method for operating a sortation system in accordance with various embodiments.

Referring now to FIG. 3, a method 300 is provided for operating a sortation system. The method includes a step 301 of receiving, at a first conveyor, at least one receptacle including a plurality of products. The method also includes a step 303 of transporting, by the first conveyor, the at least one receptacle to a sortation station. The method also includes a step 305 of transferring, at the sortation station, at least one product of the plurality of products from the at least one receptacle to one of a plurality of vessels of a sorter based on at least one identifier assigned to the at least one of the plurality of products. The method also includes a step 307 of ejecting, using an ejection mechanism of the vessel, the at least one product of the plurality of products from the vessel in response to transportation of the vessel by the sorter to one of a plurality of sortation delivery stations corresponding to the ejected product. The method also includes a step 309 of transferring the at least one product of the plurality of products from the corresponding sortation delivery station to one of a plurality of order-specific portions of an order consolidation station based on the at least one identifier assigned to the at least one of the plurality of products.

The step 301 of receiving, at a first conveyor, at least one receptacle including a plurality of products can include, for example, but not limited to, receiving a plurality of products 101a-1 in a receptacle 103 at a first conveyor 105 as described above with reference to FIGS. 1 and 2. The step 303 of transporting, by the first conveyor, the at least one receptacle to a sortation station can include, for example, but not limited to, transporting the receptacle 103 and the plurality of products 101a-1 to the sortation station 107 via the first conveyor 105 as described above with reference to FIGS. 1 and 2. The step 305 of transferring, at the sortation station, at least one product of the plurality of products from the at least one receptacle to one of a plurality of vessels of a sorter based on at least one identifier assigned to the at least one of the plurality of products can include, for example, but not limited to, transferring the products 101a-1 from the receptacle 103 to the vessels 111 at the sortation station 107 as described above with reference to FIGS. 1 and 2.

The step 307 of ejecting, using an ejection mechanism of the vessel, the at least one product of the plurality of products from the vessel in response to transportation of the vessel by the sorter to one of a plurality of sortation delivery stations corresponding to the ejected product can include, for example, but not limited to, activating the ejection mechanism of the vessel 111 to eject the corresponding product 101a-1 at a corresponding sortation delivery station 115a, 115b as described above with reference to FIGS. 1 and 2. The step 309 of transferring the at least one product of the plurality of products from the corresponding sortation delivery station to one of a plurality of order-specific portions of an order consolidation station based on the at least one identifier assigned to the at least one of the plurality of products can include, for example, but not limited to, transferring the plurality of products 101a-1 from the sortation delivery station 115a, 115b to the corresponding order specific portions 119a-d of the corresponding order consolidation station 117a, 117b as described above with reference to FIGS. 1 and 2.

Exemplary Computing Devices

Figure 4:
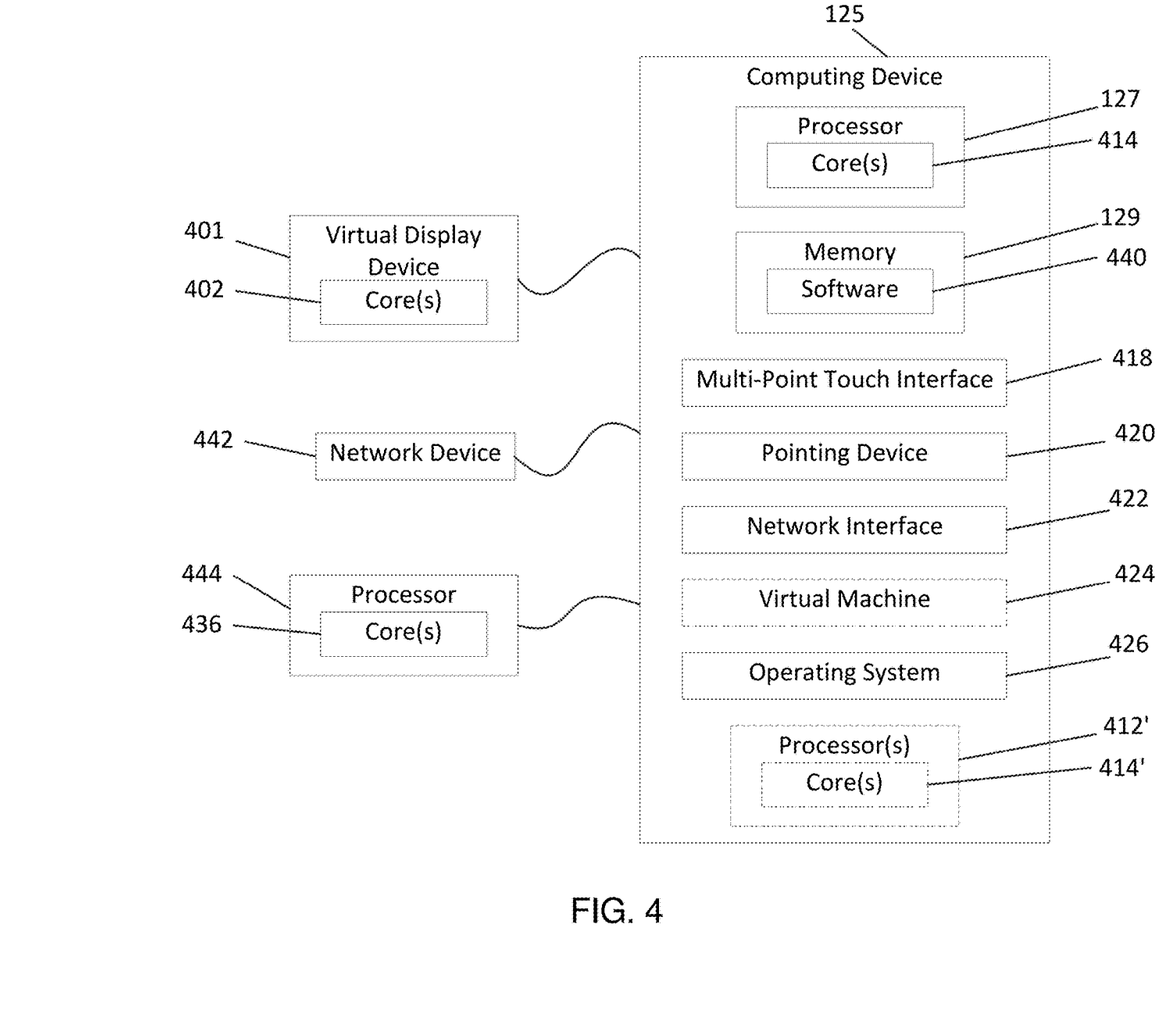
FIG. 4 is an example computational device block diagram depicting various components which can be used to implement various of the disclosed embodiments.

FIG. 4 is a block diagram of an exemplary computing device 125 such as can be used, or portions thereof, in accordance with various embodiments and, for clarity, refers back to and provides greater detail regarding various elements of the system 100 of FIG. 1. The computing device 125 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 129 included in the computing device 125 can store computer-readable and computer-executable instructions or software for performing the operations disclosed herein. For example, the memory 129 can store a software application 440 which is configured to perform various of the disclosed operations (e.g., activation the ejection mechanism of the vessel 111 based on the position of the vessel 111 relative to the sortation delivery station 115a, 115b). The computing device 125 can also include configurable and/or programmable processor 127 and an associated core 414, and optionally, one or more additional configurable and/or programmable processing devices, e.g., processor(s) 412' and associated core(s) 414' (for example, in the case of computational devices having multiple processors/cores), for executing computer-readable and computer-executable instructions or software stored in the memory 129 and other programs for controlling system hardware. Processor 127 and processor(s) 412' can each be a single core processor or multiple core (414 and 414') processor.

Virtualization can be employed in the computing device 125 so that infrastructure and resources in the computing device can be shared dynamically. A virtual machine 424 can be provided to handle a process running on multiple processors so that the process appears to be using only one computing resource rather than multiple computing resources. Multiple virtual machines can also be used with one processor.

Memory 129 can include a computational device memory or random access memory, such as DRAM, SRAM, EDO RAM, and the like. Memory 129 can include other types of memory as well, or combinations thereof.

A user can interact with the computing device 125 through a visual display device 428, such as a computer monitor, which can display one or more user interfaces 430 that can be provided in accordance with exemplary embodiments. The computing device 125 can include other I/O devices for receiving input from a user, for example, a keyboard or any suitable multi-point touch interface 418, a pointing device 420 (e.g., a mouse). The keyboard 418 and the pointing device 420 can be coupled to the visual display device 428. The computing device 125 can include other suitable conventional I/O peripherals.

The computing device 125 can also include one or more storage devices 434, such as a hard-drive, CD-ROM, or other computer readable media, for storing data and computer-readable instructions and/or software that perform operations disclosed herein. Exemplary storage device 434 can also store one or more databases for storing any suitable information required to implement exemplary embodiments. The databases can be updated manually or automatically at any suitable time to add, delete, and/or update one or more items in the databases.

The computing device 125 can include a network interface 422 configured to interface via one or more network devices 432 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 422 can include a built-in network adapter, network interface card, PCMCIA network card, card bus network adapter, wireless network adapter, USB network adapter, modem or any other device suitable for interfacing the computing device 125 to any type of network capable of communication and performing the operations described herein. Moreover, the computing device 125 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 125 can run any operating system 426, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 426 can be run in native mode or emulated mode. In an exemplary embodiment, the operating system 426 can be run on one or more cloud machine instances.

Figure 5:
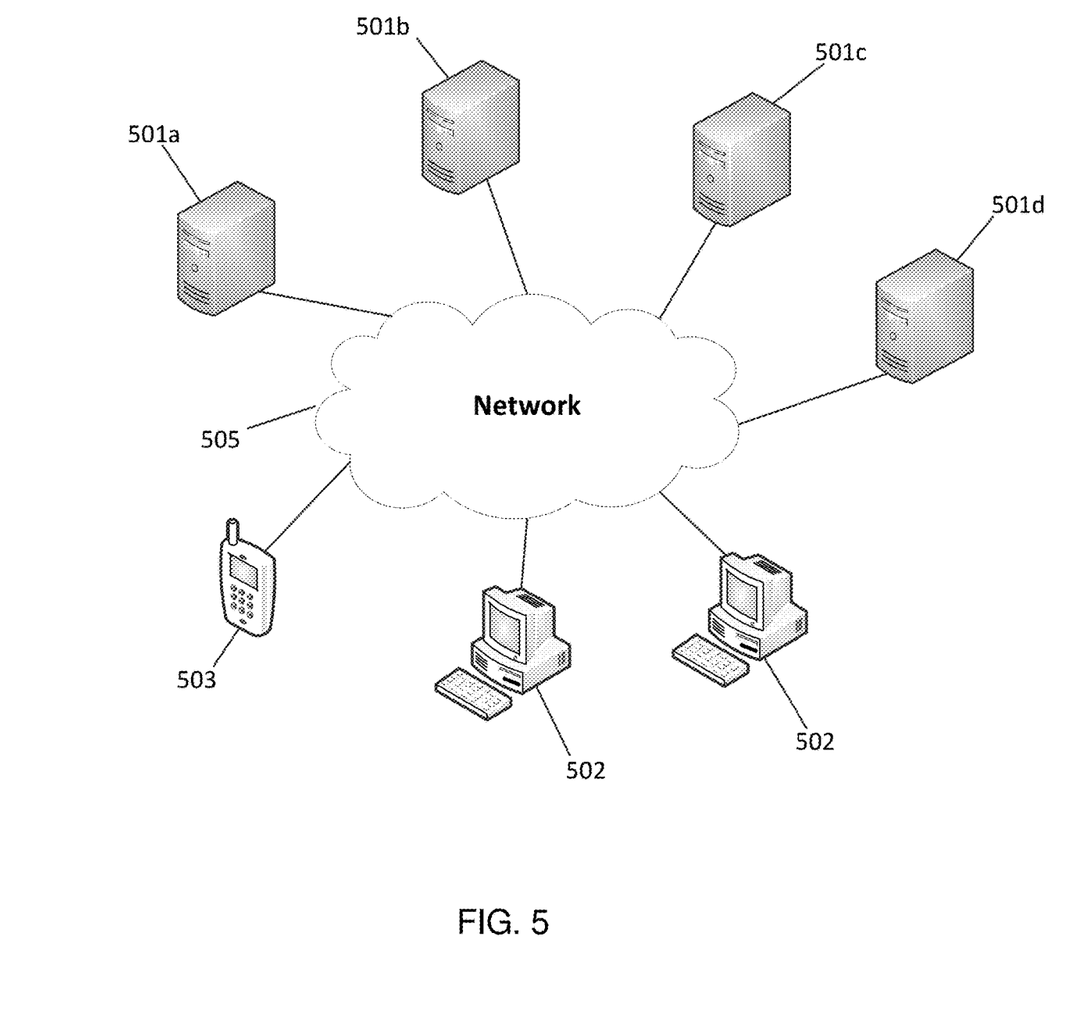
FIG. 5 is an example computational device block diagram depicting various components which can be used to implement various of the disclosed embodiments in a distributed system.

FIG. 5 is an example computational device block diagram of certain distributed embodiments. Although FIG. 1, and portions of the exemplary discussion above, make reference to a centralized system 100 operating on a single computing device, one will recognize that various of the modules within the system 100 may instead be distributed across a network 505 in separate server systems 501*a-d* and possibly in user systems, such as a desktop computer device 502, or mobile computer device 503. As one example, users may download an application to their desktop computer device or mobile computer device, which is configured to operate as the central computing device 125. As another example, the vessel tracking system can be included in a client side application of a client-server environment, wherein the central computing device 125 is hosted by a server and interacted with by the desktop computer device or mobile device. In some distributed systems, the modules of the system 100 can be separately located on server systems 501*a-d* and can be in communication with one another across the network 505.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

What is claimed is:

1. A sortation system comprising:
   a first conveyor configured to transport at least one receptacle to a sortation station, the at least one receptacle configured to receive a plurality of products;
   a sorter comprising a plurality of vessels, each vessel of the plurality of vessels configured to receive at least one product of the plurality of products from the sortation station for transportation by the sorter, each vessel of the plurality of vessels including an ejection mechanism located on the vessel for ejecting the at least one product of the plurality of products from the vessel at a specified sortation delivery station that corresponds to the at least one product of the plurality of products based on at least one identifier assigned to the at least one product, wherein the ejection mechanism is one of more of a robot arm, a chute, a tiltable surface, a tilt tray or a gripper and is configured to activate in response to a command transmitted from a central computing system;

the central computing system configured to transmit instructions to activate an ejection mechanism on one of the plurality of vessels in response to a detection of transportation of the one of the plurality of vessels to the specified sortation delivery station, the ejection mechanism configured to eject the at least one product of the plurality of products in response to the activation instruction; and an order consolidation station comprising a plurality of order-specific portions, each order-specific portion of the plurality of order-specific portions configured to receive the at least one product of the plurality of products from the sortation delivery station based on the at least one identifier assigned to the at least one product.

2. The sortation system of claim 1, wherein the at least one identifier is a unit label unique to the assigned at least one product.

3. The sortation system of claim 1, wherein the sortation station further comprises a scanning device configured to identify each of the plurality of products transported in the at least one receptacle.

4. The sortation system of claim 3, wherein a detector of the sorter is configured to identify each vessel corresponding to each one of the plurality of products.

5. The sortation system of claim 4, wherein at least one of the sorter or the sortation station is configured to transmit the identification of each corresponding vessel and product to a central computing system.

6. The sortation system of claim 5, wherein the central computing system is in electronic communication with a vessel tracking system, the central computing system configured to activate the ejection mechanism in response to transportation of the vessel to the corresponding sortation delivery station.

7. The sortation system of claim 3, wherein the at least one identifier is a unit label unique to the assigned at least one product and the scanning device is configured to read the at least one identifier to identify the each of the plurality of products transported in the at least one receptacle.

8. The sortation system of claim 3, wherein the sortation station is configured to assign the at least one identifier to the at least one product in response to identification of each of the plurality of products by the scanning device.

9. The sortation system of claim 4, wherein the scanning device is configured to identify each receptacle by reading at least one receptacle identifier.

10. The sortation system of claim 1, wherein each of the plurality of vessels is permanently attached to the sorter.

11. The sortation system of claim 1, further comprising a packaging station for receiving one or more of the products from one of the order-specific portions and packaging the received one or more of the products.

12. The sortation system of claim 1, wherein the ejection mechanism also comprises one of more of a manipulator, or an automaton.

13. A method for operating a sortation system comprising:
receiving, at a first conveyor, at least one receptacle including a plurality of products;
transporting, by the first conveyor, the at least one receptacle to a sortation station;
transferring, at the sortation station, at least one product of the plurality of products from the at least one receptacle to one of a plurality of vessels of a sorter based on at least one identifier assigned to the at least one of the plurality of products;
ejecting, using an ejection mechanism located on the vessel, the at least one product of the plurality of products from the vessel in response to instructions received from a central computing system to activate the ejection mechanism following a detection of transportation of the vessel by the sorter to one of a plurality of sortation delivery stations corresponding to the ejected product, wherein the ejection mechanism is one of more of a robot arm, a chute, a tiltable surface, a tilt tray or a gripper;
transferring the at least one product of the plurality of products from the corresponding sortation delivery station to one of a plurality of order-specific portions of an order consolidation station based on the at least one identifier assigned to the at least one of the plurality of products.

14. The method of claim 13, wherein the at least one identifier is a unit label unique to the assigned at least one product.

15. The method of claim 13, wherein the step of transferring, at the sortation station, the at least one of the plurality of products from the at least one receptacle to one of a plurality of vessels of a sorter further comprises scanning, by a scanning device, the at least one of the plurality of products.

16. The method of claim 15, further comprising identifying, using a detector of the sorter, the vessel corresponding to the at least one of the plurality of products.

17. The method of claim 16, further comprising transmitting, to a central computing system, identification of the corresponding vessel and at least one of the plurality of products to a central computing system.

18. The method of claim 17, further comprising monitoring, at the central computing system by a vessel tracking system, a position of the vessel.

19. The method of claim 18, further comprising transmitting, from the central computing device, instructions to activate the ejection mechanism in response to transportation of the vessel to the corresponding sortation delivery station.

20. The method of claim 13, further comprising transferring at least one product from the order-specific portion of the order consolidation station to a packaging station.

21. The method of claim 20, further comprising packaging the at least one product at the packaging station.

* * * * *